US008737195B2

(12) United States Patent
Ohashi

(10) Patent No.: US 8,737,195 B2
(45) Date of Patent: May 27, 2014

(54) REFERENCE SIGNAL COLLISION DETECTION

(75) Inventor: Kazunori Ohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 13/232,612

(22) Filed: Sep. 14, 2011

(65) Prior Publication Data

US 2012/0135764 A1 May 31, 2012

(30) Foreign Application Priority Data

Nov. 30, 2010 (JP) ................................ 2010-266980

(51) Int. Cl.
*G01R 31/08* (2006.01)
*H04J 3/16* (2006.01)
*H04B 1/00* (2006.01)
*H04B 17/00* (2006.01)
*H04B 7/00* (2006.01)

(52) U.S. Cl.
USPC ........... 370/216; 370/346; 455/522; 455/524; 455/63.1; 455/67.13

(58) Field of Classification Search
USPC ......... 370/216, 242, 252, 278, 282, 332–333, 370/346, 449, 474, 476, 500; 455/432.1, 455/434, 436, 450, 522, 524, 525, 63.1, 455/63.4, 67.13, 67.14, 68
See application file for complete search history.

(56) References Cited

U.S. PATENT DOCUMENTS

| 2006/0009227 A1* | 1/2006 | Cudak et al. ............... 455/450 |
| 2010/0234016 A1* | 9/2010 | Palanki et al. ............. 455/424 |
| 2010/0317351 A1* | 12/2010 | Gerstenberger et al. ...... 455/443 |
| 2011/0159901 A1* | 6/2011 | Frenger et al. .............. 455/502 |

FOREIGN PATENT DOCUMENTS

| JP | 11-308655 A | 11/1999 |
| JP | 2002209253 A | 7/2002 |

* cited by examiner

*Primary Examiner* — Redentor Pasia
(74) *Attorney, Agent, or Firm* — Sughrue Mion, PLLC

(57) ABSTRACT

A base station outputs first detection information representing a code of a reference signal and representing a mobile device that is determined, on the basis of transition of a status at the time of occurrence of disconnection of the radio link between the mobile device and the base station, to be capable of causing the collision, and second detection information representing a code of a reference signal and representing a mobile device that is determined, on the basis of occurrence of failure of reconnection of the radio link between the mobile device and the base station, to be capable of causing the collision. A collision detection device estimates that, when the code and the mobile device of the first detection information coincide with the code and the mobile device of the second detection information, the collision of the reference signal will be caused.

10 Claims, 5 Drawing Sheets

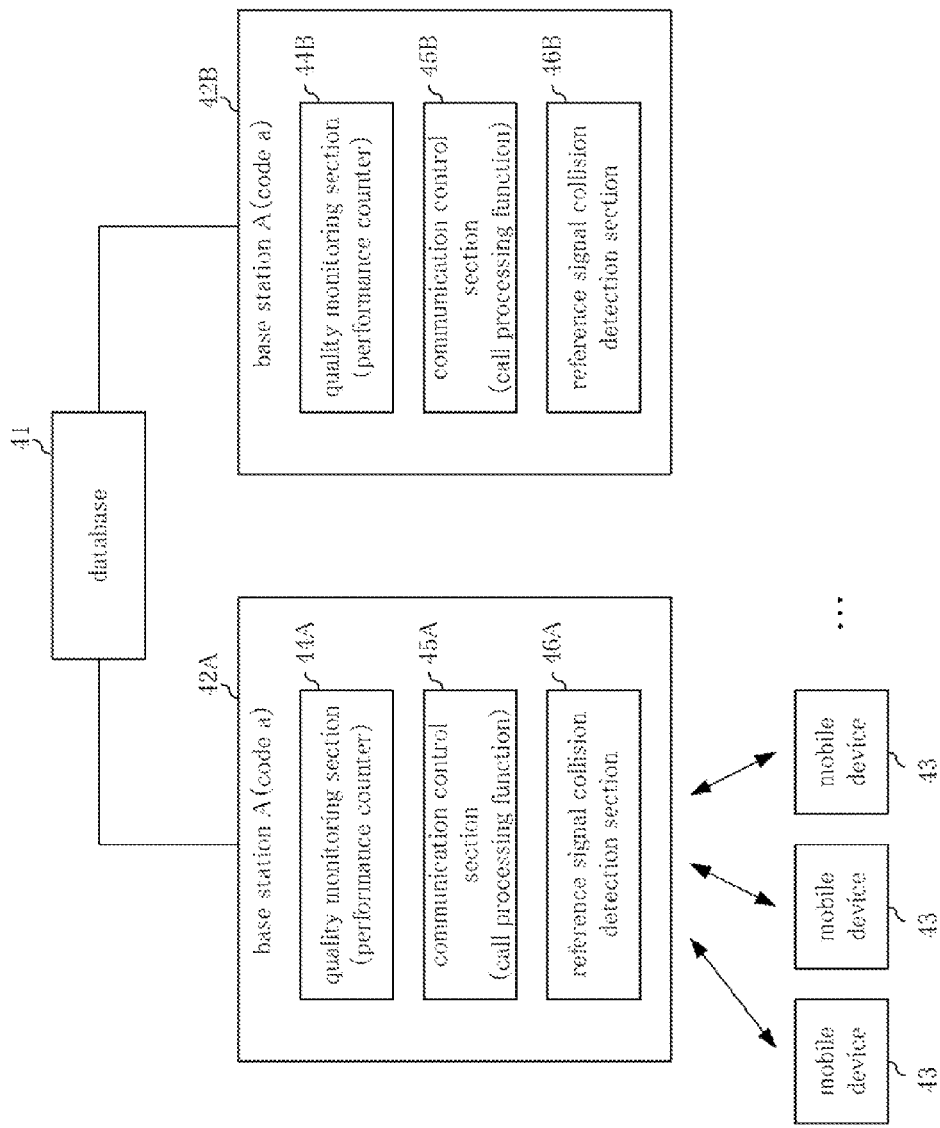

REFERENCE SIGNAL COLLISION DETECTION

REFERENCE SIGNAL COLLISION DETECTION

This application is based upon and claims the benefit of priority from Japanese Patent Application No. 2010-266980 filed on Nov. 30, 2010, the content of which is incorporated by reference.

TECHNICAL FIELD

The present invention relates to a mobile communication system in which a plurality of base stations respectively configure radio communication areas and in which each of the base stations is connected to a mobile device by a radio circuit.

BACKGROUND ART

In a mobile communication network, such as a CDMA communication network or an LTE (Long Term Evolution) communication network, a plurality of radio base stations configure radio communication areas, respectively. Each of the base stations transmits a reference signal encoded by using a code assigned to each of the base stations (see JP11-308655A). A mobile device decodes the reference signal received from each of the plurality of base stations and identifies each of the base stations by identifying the code of the reference signal.

The number of the codes used by the base stations to encode the reference signal is limited, and the codes are reused in the mobile communication network. For this reason, there is a case where a plurality of base stations using the same code exist among the base stations included in the mobile communication network.

Usually, the code of each of the base stations is determined automatically or manually so as to prevent the radio communication areas of the base stations that use the same code from overlapping with each other. However, since the radio communication areas complicatedly overlap with each other, there is a high possibility that the radio communication areas of the base stations that use the same code will overlap with each other in a part of the areas. Further, there is also a possibility that the radio communication areas of the base stations that use the same code will overlap with each other due to human error.

Here, for example, a case is considered in which each of two base stations A and B that respectively configure radio communication areas adjacent to each other transmits a reference signal by using the same code. In this case, even when a mobile device moves from the radio communication area of base station A to the radio communication area of base station B, the code of the reference signal having the highest reception intensity is not changed. For this reason, the mobile device cannot recognize that it has moved from the radio communication area of base station A to the radio communication area of base station B. As a result, the mobile device is disposed to continue communication with base station A.

However, since the mobile device has actually moved into the radio communication area of base station B, the quality of communication with base station A has deteriorated, so that communication with base station A is disconnected. Here, assume that the phenomenon that causes communication disconnection to be generated in this way will be referred to as "collision" of a code of a radio reference signal.

In order to detect the collision of the code of the radio reference signal, work is performed in which, while an automobile, or the like, loaded with measuring instrument moves in the radio communication areas, reference signals transmitted from a plurality of base stations and received at measurement points are measured by using the measuring instrument, and in which the reference signal with the highest reception intensity is recorded for each of the measurement points. Then, "the collision of the code of the radio reference signal" is detected in such a manner that, on the basis of the recorded information, the position and shape of the radio communication area of each of the base stations on the map are recognized and formed into an image so as to be viewed by a person.

CITATION LIST

Patent Literature

Patent Literature 1: JP-H11-308655-A

SUMMARY OF INVENTION

Technical Problem

However, much effort is required to measure the reference signals while ensuring that the automobile, or the like, that is loaded with the measuring equipment, is driven in the radio communication areas. Further, as regards the effort of manually viewing the image of the radio communication areas and detecting "the collision of the radio reference signal", accuracy of detection may not be consistent due to differences in the capability of each worker, the subjectivity of each worker and the like. Further, since measurement is performed by the worker using the measuring instrument and the automobile, there is a limitation in the measurement points, such as a limitation in which it is not possible to perform measurement in indoor areas and walking areas where the automobile cannot be driven. Thus, there is a case where the measurement is not performed throughout the radio communication area in which the mobile device is actually used.

An object of the present invention is to provide a technique which can easily detect collision of a radio reference signal with stable accuracy and without requiring much effort on the part of a worker.

Solution to Problem

In order to achieve the above-described object, a system for detecting collision of a reference signal according to the present invention includes:

a plurality of base stations each of which outputs first detection information representing a code of a reference signal and representing a mobile device receiving the code of the reference signal that is determined, on the basis of transition of a status at the time of occurrence of disconnection of the radio link between the mobile device and the base station, to be capable of causing the collision of the code of the reference signal, and second detection information representing a code of a reference signal and representing a mobile device receiving the code of the reference signal that is determined, on the basis of occurrence of failure of reconnection of the radio link between the mobile device and the base station, to be capable of causing the collision of the code of the reference signal; and a collision detection device that estimates that, in the case in which the code and the mobile device of the first detection information received from the base station coincide with the code and the mobile device of the second detection information received from the base station different from the base station from which the first detection information is received, the collision of the reference signal will be caused.

A collision detection device according to the present invention includes:

a detection information reception section that receives, from a base station, detection information representing that there is a possibility that collision of a code of a reference signal will be caused; and a collision estimation section that, in the case where the detection information reception section receives, from a first base station, first detection information representing a code of a reference signal and representing a mobile device receiving the code of the reference signal which is determined, on the basis of transition of a status at the time of occurrence of disconnection of the radio link between the mobile device and the base station, to be capable of causing the collision of the code of the reference signal, and where the detection information reception section receives, from a second base station, second detection information representing a code of a reference signal and representing a mobile device receiving the code of the reference signal which is determined, on the basis of occurrence of failure of reconnection of the radio link between the mobile device and the base station, to be capable of causing the collision of the code of the reference signal, and where the code and the mobile device of the first detection information coincide with the code and the mobile device of the second detection information, estimates that the collision of the reference signal will be caused.

A base station according to the present invention includes:

a first detection section that, on the basis of transition of a status at the time of occurrence of disconnection of a radio link between a mobile device and the base station, detects that there is a possibility that collision of a code of a reference signal will be caused;

a second detection section that, on the basis of occurrence of failure of reconnection of a radio link between a mobile device and the base station, determines that there is a possibility that collision of a code of a reference signal will be caused; and a detection information transmission section that is configured, when it is detected by the first detection section that there is a possibility that the collision of the code of the reference signal will be caused, to output first detection information representing the code of the reference signal and representing the mobile device receiving the code of the reference signal which is detected to be capable of causing the collision of the code of the reference signal, and is configured, when it is detected by the second detection section that there is a possibility that the collision of the code of the reference signal will be caused, to output second detection information representing the code of the reference signal and representing the mobile device receiving the code of the reference signal which is detected to be capable of causing the collision of the code of the reference signal.

A method for detecting a collision of a reference signal according to the present invention includes:

receiving, from a first base station, first detection information representing a code of a reference signal and representing a mobile device receiving the code of the reference signal that is determined, on the basis of transition of a status at the time of occurrence of disconnection of the radio link between the mobile device and the base station, to be capable of causing the collision of the code of the reference signal;

receiving, from a second base station, second detection information representing a code of a reference signal and representing a mobile device receiving the code of the reference signal that is determined, on the basis of occurrence of failure of reconnection of the radio link between the mobile device and the base station, to be capable of causing the collision of the code of the reference signal; and estimating that, in the case where the code and the mobile device of the first detection information coincide with the code and the mobile device of the second detection information, a collision of the reference signal will be caused.

Advantageous Effects of Invention

According to the present invention, it is possible to easily detect collision of a code of a reference signal with stable accuracy and without requiring much effort on the part of a worker.

The above and other objects, features, and advantages of the present invention will become apparent from the following description with reference to the accompanying drawings which illustrate an example of the present invention.

BRIEF DESCRIPTION OF DRAWINGS

FIG. 5 is a block diagram showing a configuration of a mobile communication system of the exemplary embodiment.

EXEMPLARY EMBODIMENTS

An exemplary embodiment for carrying out the present invention will be described in detail with reference to the accompanying drawings.

A basic exemplary embodiment according to the present invention will be described.

Figure 1:
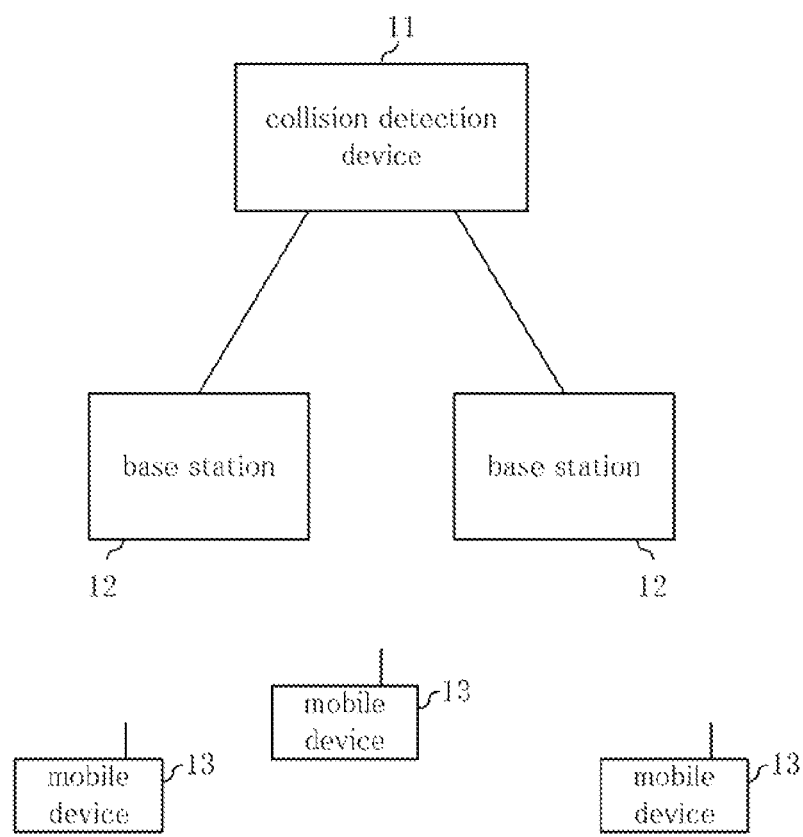
FIG. 1 is a block diagram showing a configuration of a mobile communication system of an exemplary embodiment.

As shown in FIG. 1, a mobile communication system of the exemplary embodiment includes collision detection device 11 and a plurality of base stations 12.

Each of base stations 12 configures a radio communication area, and is connected to each of mobile devices 13 by a radio circuit.

On the basis of transition of a status at the time of occurrence of disconnection of a radio link between mobile device 13 and base station 12, base station 12 detects that there is a possibility that collision of a code of a reference signal will be caused. Then, when detecting that there is a possibility that a collision of the code of the reference signal will be caused, base station 12 transmits, to collision detection device 11, first detection information representing the code of the reference signal and representing the mobile device receiving the code of the reference signal.

Further, on the basis of occurrence of failure of reconnection of a radio link between mobile device 13 and base station 12, base station 12 detects that there is a possibility that collision of a code of a reference signal will be caused. Then, when detecting that there is a possibility that a collision of the code of the reference signal will be caused, base station 12 transmits, to collision detection device 11, second detection information representing the code of the reference signal and representing the mobile device receiving the code of the reference signal.

When the code and the mobile device of the first detection information received from base station 12 coincide with the code and the mobile device of the second detection information received from base station 12 different from base station 12 from which the first detection information is received, collision detection device 11 estimates that the collision of the code of the reference signal will be caused.

According to the exemplary embodiment, the estimation is performed by base station 12 on the basis of the phenomenon occurring in mobile device 13, and hence the occurrence of collision of a code of a reference signal can be easily estimated without requiring much effort on the part of a worker.

Further, with the exemplary embodiment, estimation is not performed manually by a worker, but is performed by processing performed by base station 12 and collision detection device 11, and hence it is possible to stably perform estimation without any variability that may be caused due to the level of ability and subjectivity of the worker.

Further, with the exemplary embodiment, estimation is not performed by using a dedicated measuring instrument and an automobile but is performed on the basis of the actual status of mobile device 13, and hence it is possible to perform estimation based on measurement throughout the radio communication area in which mobile device 13 is actually used.

Figure 2:
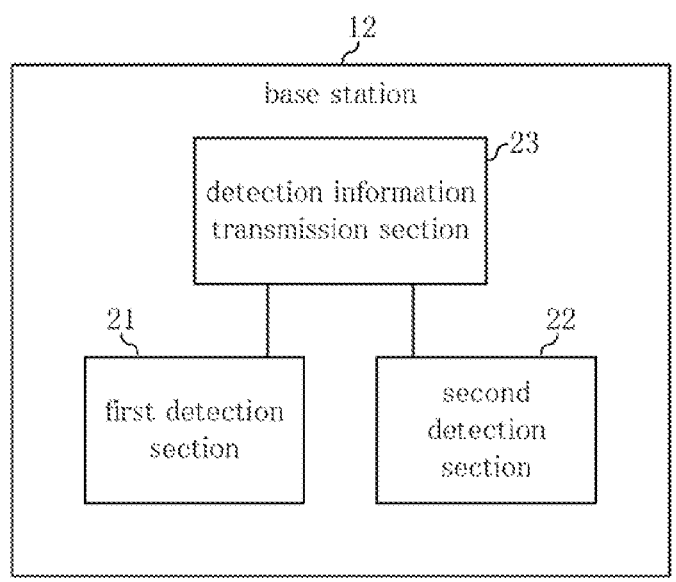
FIG. 2 is a block diagram showing a configuration of a base station of the exemplary embodiment.

As shown in FIG. 2, base station 12 includes first detection section 21, second detection section 22, and detection information transmission section 23.

On the basis of occurrence of disconnection of a radio link between mobile device 13 and base station 12, first detection section 21 detects that there is a possibility that collision of a code of a reference signal will be caused.

In the following, specific processing of first detection section 21 will be described.

When an event in which the number of occurrences of abnormal call disconnection due to an unknown cause reaches a threshold value or more is generated in mobile device 13 that is connected to base station 12, first detection section 21 of base station 12 requires mobile device 13 to provide notification of the event at the time when the reception intensity of the reference signal reaches a threshold value or less.

Further, first detection section 21 requires mobile device 13, which provides notification of the event, to periodically inform the reception intensity of the reference signal. First detection section 21 records transition of the reception intensity of the reference signal in mobile device 13 and transition of the power control performed to mobile device 13. In the case where a specific pattern is generated in which, when a radio link disconnection is caused, the reception intensity of the reference signal is reduced and thereafter the reception intensity of the reference signal is increased, and in which the power control to increase transmission power is also continuously performed, first detection section 21 detects that there is a possibility that collision of a code of a reference signal will be caused.

On the basis of occurrence of failure of reconnection of a radio link between mobile device 13 and base station 12, second detection section 22 of base station 12 detects that there is a possibility that collision of a code of a reference signal will be caused. Specifically, when a failure of reconnection of a radio link between mobile device 13 and base station 12 occurs, second detection section 22 of base station 12 detects that there is a possibility that collision of a code of a reference signal will be caused.

When it is detected by first detection section 21 that there is a possibility that collision of a code of a reference signal will be caused, detection information transmission section 23 transmits, to collision detection device 11, first detection information representing the code of the reference signal and representing the mobile device receiving the code of the reference signal having a possibility of causing the collision of the code of the reference signal. Further, when it is detected by second detection section 22 that there is a possibility that collision of a code of a reference signal will be caused, detection information transmission section 23 transmits, to collision detection device 11, second detection information representing the code of the reference signal and representing the mobile device receiving the code of the reference signal having a possibility of causing the collision of the code of the reference signal.

Figure 3:
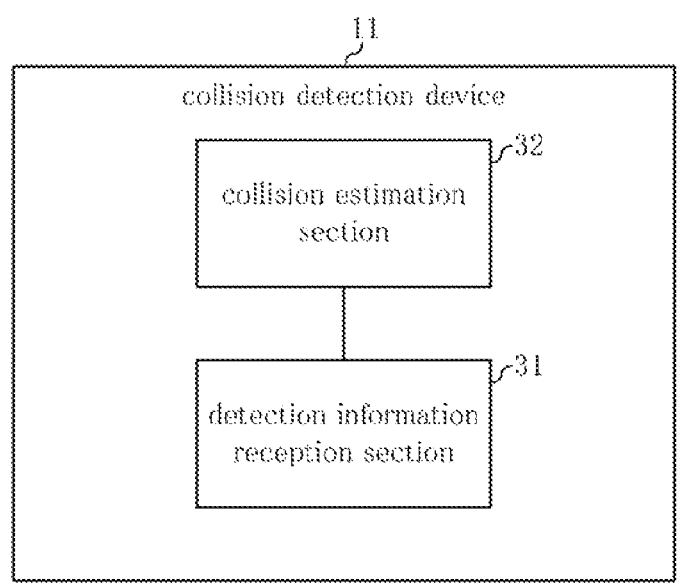
FIG. 3 is a block diagram showing a configuration of a collision detection device of the exemplary embodiment.

As shown in FIG. 3, collision detection device 11 includes detection information reception section 31 and collision estimation section 32.

Detection information reception section 31 receives, from base station 12, the first detection information and the second detection information, each of which represents that there is a possibility that collision of a code of a reference signal will be caused.

The first detection information is the information transmitted from base station 12 (first base station 12) and that represents a code of a reference signal and mobile device 13 receiving the code of the reference signal that is determined, in first base station 12 and on the basis of transition of a status at the time of occurrence of disconnection of the radio link between mobile device 13 and first base station 12, to be capable of causing the collision of the code of the reference signal.

The second detection information is the information transmitted from other base station 12 (second base station 12) and that represents a code of a reference signal and mobile device 13 receiving the code of the reference signal that is determined, on the basis of occurrence of failure of reconnection of the radio link between the mobile device 13 and second base station 12, to be capable of causing the collision of the code of the reference signal.

When the first detection information transmitted from first base station 12 and the second detection information transmitted from second base station 12 are received in detection information reception section 31, and when the code and the mobile device represented by the first detection information coincide with the code and the mobile device represented by the second detection information, collision estimation section 32 estimates that the collision of the code of the reference signal is caused.

Figure 4:
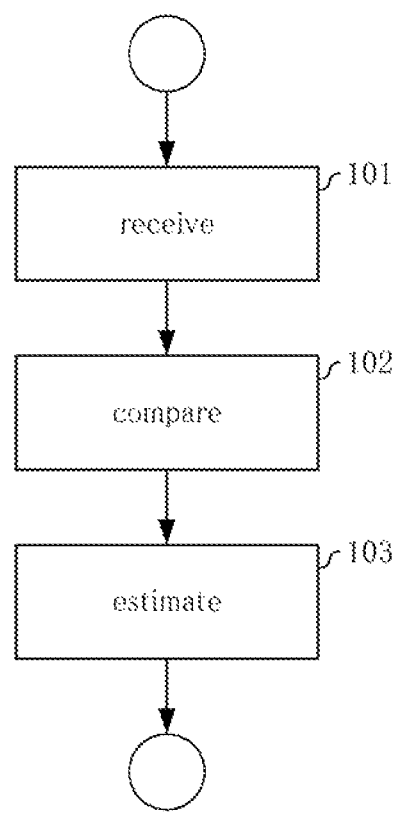
FIG. 4 is a flow chart showing an operation of the collision detection device of the exemplary embodiment.

In the following, an operation of collision detection device 11 of the exemplary embodiment will be described with reference to FIG. 4.

When collision detection device 11 receives the first detection information and the second detection information from a plurality of base stations 12 in step 101, collision detection device 11 compares, in step S102, the information on the code and the mobile device included in the received first detection information, with the information on the code and the mobile device included in the received second detection information.

Then, when the code and the mobile device represented by the first detection information coincide with the code and the mobile device represented by the second detection information, collision detection device 11 estimates in step 103 that the collision of the code of the reference signal is caused.

In the following, a more specific exemplary embodiment will be described.

As shown in FIG. 5, a mobile communication system includes database 41, base stations 42A and 42B, and mobile devices 43.

Database 41 corresponds to collision detection device 11 in FIG. 1, and base stations 42A and 42B correspond to base stations 12 in FIG. 1. Further, mobile devices 43 correspond to mobile devices 13 in FIG. 1. Base station 42A (base station A) and base station 42B (base station B) have the same configuration.

Each of base stations 42A and 42B includes quality monitoring section 44, communication control section 45, and reference signal collision detection section 46. The functions corresponding to those of first and second detection sections 21 and 22 in FIG. 2 are realized by quality monitoring section 44, communication control section 45, and reference signal collision detection section 46.

In the following, an operation of the mobile communication system of the exemplary embodiment will be successively described. Here, it is assumed that same code a is used in both base station 42A and base station 42B, and that the collision of the code of the reference signal will be caused. As can be seen from the description of the exemplary embodiment described above, the collision of the code of the reference signal in the exemplary embodiment is not detected manually by the operators of an operator using the measuring instrument but is detected by the mobile communication network itself.

(1) Quality monitoring section 44A of base station 42A counts, by using a counter, values of various kinds of communication quality of mobile device 43 connected to base station 42A. For example, the number of occurrences of call disconnection due to various causes is counted for each of the causes. When it is determined by monitoring the counter that abnormal call disconnections due to an unknown cause are generated, there is a possibility that the disconnections are caused due to collision of a code of a reference signal.

(2) When quality monitoring section 44A detects that the number of occurrences of abnormal call disconnection generated due to an unknown cause becomes a predetermined threshold value or more, base station 42A transmits, from communication control section 45A to mobile device 43, an event detection request requesting that, when an event in which the quality level of the reference signal reaches a threshold level or less is generated, mobile device 43 reports the event to base station 42A. When call disconnection is caused due to the overlapping of the code of the reference signal, the call disconnection is not a normal call disconnection due to a cause assumed in advance. Therefore, the call disconnection due to the overlapping of the code of the reference signal is classified into an abnormal call disconnection due to an unknown cause.

Mobile device 43 always measures the quality of the reference signal. However, mobile device 43 does not report the measurement result to base station 42 unless there is a request (event detection request) from base station 42. Thus, base station 42A transmits, to mobile device 43, the event detection request requesting that, when an event in which the quality level of the reference signal reaches the threshold level or less is generated, mobile device 43 reports the event to base station 42A. Specific examples of the event include Event A1, Event A2, and the like, in the case of the LTE system.

(3) When the condition of the requested event is satisfied, mobile device 43, which has received the event detection request, reports the event to base station 42A.

(4) Base station 42A, which has received the reports of the event in (3), sends, from communication control section 45A to mobile device 43 from which the report of the event was sent, an event detection request requesting that mobile device 43 report the reception intensity of the reference signal to base station 42A periodically, (for example, every one second). While the event detection request is sent from communication control section 45A to mobile device 43, quality monitoring section 44A in base station 42A starts recording of the reception power of the control signal outputted from mobile device 43, and recording of the power control signal notified to mobile device 43 from base station 42A in order to control the transmission power of mobile device 43. Thereby, the reception intensity of the signal which is transmitted from base station 42A and received by mobile device 43, the reception power of the control signal which is transmitted from mobile device 43 and received by base station 42A, and the power control signal which is transmitted to mobile device 43 from base station 42A to control the transmission power of mobile device 43, are recorded in association with mobile device 43 which reported in (3) the event in which the quality level of the reference signal reached the threshold level or lower.

(5) In base station 42A, reference signal collision detection section 46A checks, on the basis of the information recorded in (4), the transition of the reception intensity of the reference signal and the transition of the power control signal, which are associated with mobile device 43 in which the disconnection of the radio link between mobile device 43 and base station 42A was caused.

In the case where the radio link disconnection is not caused by collision of a code of a reference signal but is caused by the lowering of the reception intensity, when the reception intensity of the reference signal is reduced, power control is performed so as to increase the transmission output of mobile device 43. This is because, since radio wave propagation attenuation between base station 42A and mobile device 43 is increased, it is necessary to increase the output of mobile device 43.

On the other hand, in the case where the radio link disconnection is caused due to collision of a code of a reference signal, it is conceivable that the reception intensity of the reference signal is reduced once and thereafter increased. This is because, since the reference signal of the same code is transmitted from different base station 42B, mobile device 43 reports the reception intensity of the reference signal by erroneously recognizing the reference signal from base station 42B as the reference signal from base station 42A. However, the reception power of the control signal transmitted to base station 42A from mobile device 43 is reduced as the distance between mobile device 43 and base station 42A is increased, and hence base station 42A instructs mobile device 43 to perform power control so as to increase the transmission output power.

(6) When detecting a specific pattern in which, after the reception intensity of the reference signal in mobile device 43 is reduced once, the reception intensity of the reference signal is then increased and also power control to increase the transmission power of mobile device 43 is performed, reference signal collision detection section 46A registers the detection result in database 41. The registered contents are the code of base station 42A and the identification information of mobile device 43 connected to base station 42A.

(7) Mobile device 43, in which the disconnection of the radio link between mobile device 43 and base station 42A will be caused, requests base station 42B to reconnect the radio link between mobile device 43 and base station 42B. However, the request is not associated with the normal movement between the base stations but is associated with the radio link reconnection, and hence the mobile device information of mobile device 43 is not notified to base station 42B. For this reason, the reconnection of the radio link between base station 42B and mobile device 43 failed. When detecting the event of failure of the radio link reconnection, reference signal collision detection section 46B of base station 42B determines that there is a possibility that the collision of the code of the reference signal will be caused. Then, reference signal collision detection section 46B registers the generation of the event in database 41. The registered contents are the code of base station 42B, and the identification information of mobile device 43 in which reconnection of the radio link between mobile device 43 and base station 42B has failed.

(8) By checking the coincidence between the information registered in (6) and the information registered in (7) after registration of the information in (6), database 41 detects that same mobile device 43 failed to move between two different base stations 42A and 42B using the same code, and estimates that the overlapping of the code of the reference signal will be caused.

Note that a validity period is set in the information registered in (6) in order to avoid erroneous detection, and database 41 discards the information whose validity has expired.

Further, it is assumed that the exemplary embodiment is mainly used in an LTE system, but the present invention is not limited to the LTE system. The present invention can also be applied similarly to a CDMA system.

Further, in the exemplary embodiment, the detection of the event, and the collection and analysis of data are performed for mobile device 43 selected as a check object in (2) and (3), but processing for selecting the check object in this way is not indispensable in the present invention. Mobile device 43 set as a check object may also be selected by the other method. Further, in base station 42 in which the load of usual call processing is sufficiently low, all mobile devices 43 may be set as check objects.

In the above, the exemplary embodiment according to the present invention has been described. However, the present invention is not limited to the exemplary embodiment, and combinational use and partial modification thereof are possible within the scope and spirit of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A system for detecting collision of a reference signal comprising:
   a plurality of base stations, each of of the plurality of base stations outputs first detection information representing a code of a reference signal and representing a mobile device receiving the code of the reference signal, the code of the reference signal determined on the basis of transition of a status at the time of occurrence of disconnection of the radio link between the mobile device and a first base station of the plurality of base stations, to be capable of causing the collision of the code of the reference signal, and second detection information representing a code of a reference signal and representing a mobile device receiving the code of the reference signal, the code of the reference signal on the basis of occurrence of failure of reconnection of the radio link between the mobile device and a second base station of the plurality of base stations, to be capable of causing the collision of the code of the reference signal; and
   a collision detection device that estimates that, in the case where the code and the mobile device of the first detection information received from the first base station coincide with the code and the mobile device of the second detection information received from the second base station different from the first base station from which the first detection information is received, the collision of the code of the reference signal will be caused.

2. The system for detecting collision of the reference signal according to claim 1,
   wherein the first base station records transition of reception intensity of the reference signal in the mobile device, and transition of power control to the mobile device, and outputs the first detection information at the time of generation of a specific pattern in which, after the reception intensity of the reference signal is reduced, the reception intensity of the reference signal is increased, and also power control to increase transmission power is continuously performed.

3. The system for detecting collision of the reference signal according to claim 2,
   wherein, when an event in which the number of occurrences of abnormal call disconnection due to an unknown cause reaches a threshold value or more is generated, the first base station requires the mobile device to provide notification of the event at the time when the level of the reception intensity of the reference signal reaches a threshold level or less, and wherein the first base station requires the mobile device, from which the event is notified, to periodically provide notification of the reception intensity of the reference signal, and starts recording of power control performed to the mobile device.

4. The system for detecting collision of the reference signal according to claim 1,
   wherein the second base station outputs the second detection information when reconnection of the radio link between the mobile device and the first base station has failed.

5. A collision detection device comprising:
   a detection information reception section that receives, from a base station, detection information representing that there is a possibility that collision of a code of a reference signal will be caused; and
   a collision estimation section that, in the case where the detection information reception section receives, from a first base station, first detection information representing a code of a reference signal and representing a mobile device receiving the code of the reference signal, the code of the reference signal determined on the basis of transition of a status at the time of occurrence of disconnection of the radio link between the mobile device and the first base station, to be capable of causing the collision of the code of the reference signal, and where the detection information reception section receives, from a second base station, second detection information representing a code of a reference signal and representing a mobile device receiving the code of the reference signal, the code of the reference signal determined on the basis of occurrence of failure of reconnection of the radio link between the mobile device and the second base station, to be capable of causing the collision of the code of the reference signal, and where the code and the mobile device of the first detection information coincide with the code and the mobile device of the second detection information, estimates that the collision of the reference signal will be caused.

6. A base station comprising:
a first detection section that, on the basis of transition of a status at the time of occurrence of disconnection of a radio link between a mobile device and the base station, detects that there is a possibility that collision of a code of a reference signal will be caused;
a second detection section that, on the basis of occurrence of failure of reconnection of a radio link between a mobile device and the base station, determines that there is a possibility that collision of a code of a reference signal will be caused; and
a detection information transmission section that is configured, when it is detected by the first detection section that there is a possibility that the collision of the code of the reference signal will be caused, to output first detection information representing the code of the reference signal and representing the mobile device receiving the code of the reference signal having a possibility of causing the collision of the code of the reference signal, and is configured, when it is detected by the second detection section that there is a possibility that the collision of the code of the reference signal will be caused, to output second detection information representing the code of the reference signal and representing the mobile device receiving the code of the reference signal having a possibility of causing the collision of the code of the reference signal.

7. The base station according to claim 6,
wherein the first detection section is configured to record transition of reception intensity of the reference signal in the mobile device, and transition of power control performed to the mobile device, and is configured, at the time of generation of a specific pattern in which, after the reception intensity of the reference signal is reduced, the reception intensity of the reference signal is increased and also the power control to increase the transmission power is continuously performed, to detect that there is a possibility that the collision of the reference signal will be caused.

8. The base station according to claim 7,
wherein, when an event in which the number of occurrences of abnormal call disconnection due to an unknown cause reaches a threshold value or more is generated, the first detection section requires the mobile device to provide notification of the event at the time when the reception intensity of the reference signal reaches a threshold value or less, and wherein the first detection section requires the mobile device, from which the event is notified, to periodically provide notification of the reception intensity of the reference signal, and starts recording of power control performed to the mobile device.

9. The base station according to claim 6,
wherein, when reconnection of the radio link between the mobile device and the base station has failed, the second detection section determines that there is a possibility that the collision of the code of the reference signal will be caused.

10. A method for detecting collision of a reference signal comprising:
receiving, from a first base station, first detection information representing a code of a reference signal and representing a mobile device receiving the code of the reference signal, the code of the reference signal determined on the basis of transition of a status at the time of occurrence of disconnection of the radio link between the mobile device and the first base station, to be capable of causing the collision of the code of the reference signal;
receiving, from a second base station, second detection information representing a code of a reference signal and representing a mobile device receiving the code of the reference signal, the code of the reference signal determined on the basis of occurrence of failure of reconnection of the radio link between the mobile device and the second base station, to be capable of causing the collision of the code of the reference signal; and
estimating that, when the code and the mobile device of the first detection information coincide with the code and the mobile device of the second detection information, the collision of the reference signal will be caused.

* * * * *